United States Patent [19]

Ferris

[11] 4,448,371
[45] May 15, 1984

[54] CAMOUFLAGED AIRCRAFT

[76] Inventor: Carlisle K. Ferris, 50 Moraine Rd., Morris Plains, N.J. 07950

[21] Appl. No.: 425,378

[22] Filed: Sep. 28, 1982

Related U.S. Application Data

[62] Division of Ser. No. 152,300, May 22, 1980, Pat. No. 4,406,428.

[51] Int. Cl.³ .............................................. F41H 3/00
[52] U.S. Cl. .................................................. 244/1 R
[58] Field of Search ............. 244/1 R, 129.1, 129.3 S, 244/120, 117 R, 119; 355/77; 353/28; 114/15; 428/900

[56] References Cited

U.S. PATENT DOCUMENTS

| | | | |
|---|---|---|---|
| 1,045,152 | 11/1912 | Kelsey | 244/129.3 |
| 2,083,472 | 6/1937 | Reed | 434/85 |
| 2,190,691 | 2/1940 | Barclay | 114/15 |
| 2,759,814 | 8/1956 | Kegeles | 355/77 |
| 3,690,600 | 9/1972 | Cooper | 244/120 |
| 3,800,441 | 4/1974 | Macpherson | 434/85 |
| 4,076,398 | 2/1978 | Galbraith | 353/28 |
| 4,089,491 | 5/1978 | Ferris | 244/1 R |
| 4,102,734 | 7/1978 | Schiffman | 355/77 |
| 4,212,440 | 7/1980 | Ferris | 244/1 R |

OTHER PUBLICATIONS

Bell, "A-10 Colors" *Pri-fly Presents* Aug. 1978, pp. 1-16.

*Primary Examiner*—Galen L. Barefoot
*Attorney, Agent, or Firm*—Shlesinger, Arkwright, Garvey & Fado

[57] ABSTRACT

A camouflaged and deceptive preception distorted aircraft comprising an aircraft fuselage with nose tail top bottom and side surfaces having a real cockpit canopy on the top surface with length, width and height dimensions and a simulated cockpit canopy on the bottom surface positioned substantially in the same general area as the real cockpit canopy so that only one of the cockpit canopies is visible when the aircraft is perceived directly above the top surface or directly below the bottom surface, the simulated cockpit canopy having dimensions simulating the length, width and height of the real cockpit canopy, and at least one of the simulated cockpit canopy dimensions being greater than the corresponding length, width or height dimension of the real cockpit canopy; and the method for producing the simulated cockpit canopy.

6 Claims, 14 Drawing Figures

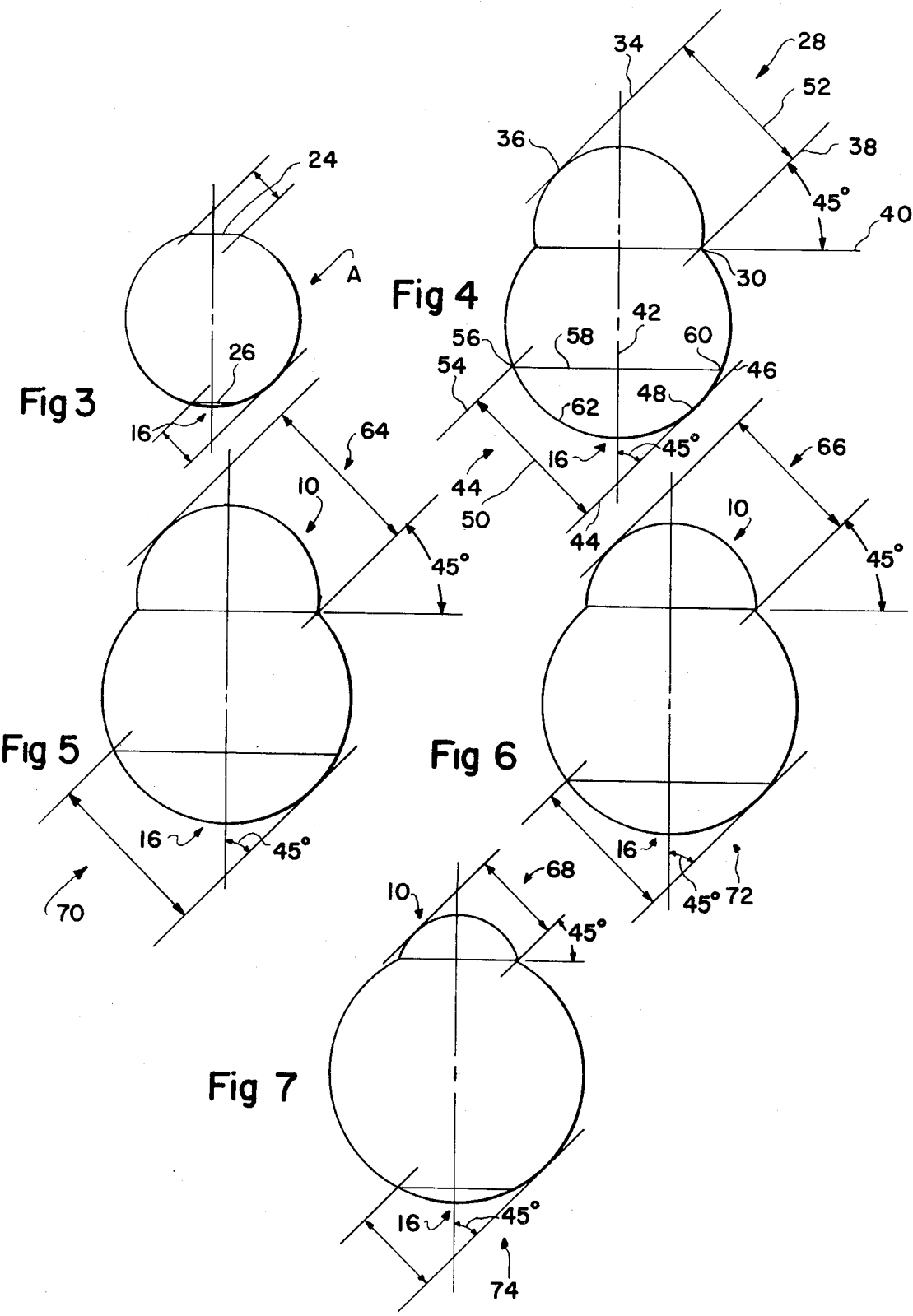

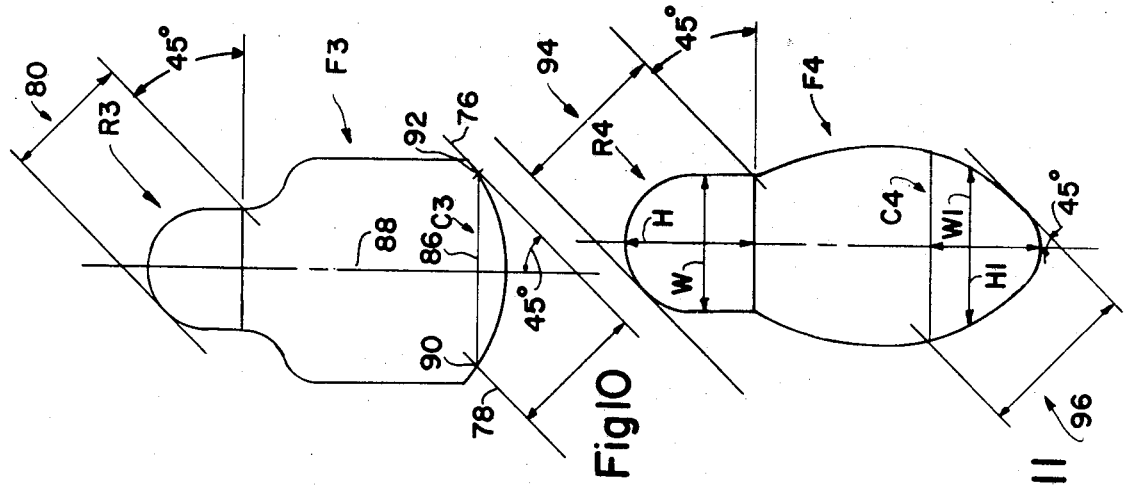
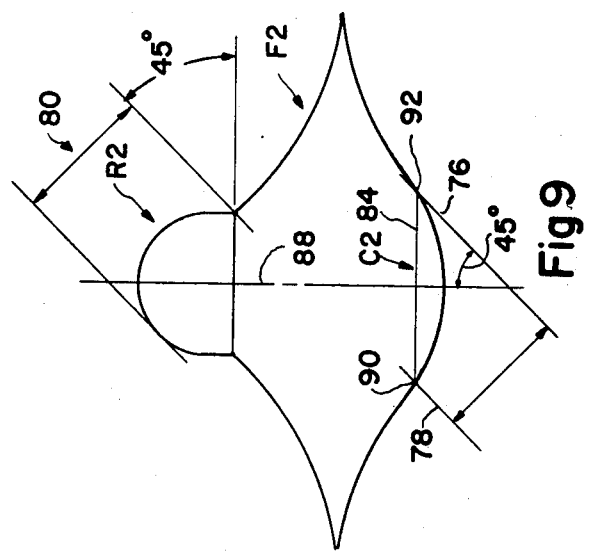
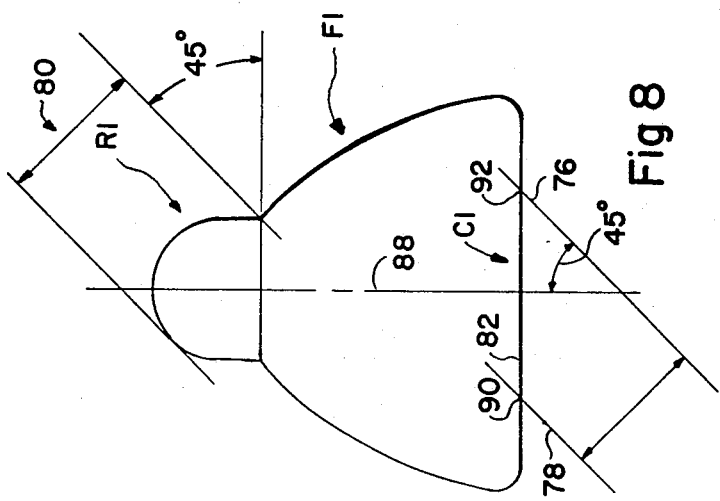
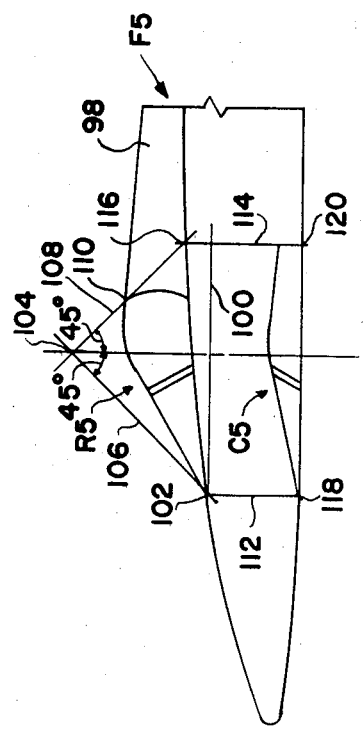

CAMOUFLAGED AIRCRAFT

This is a division of application Ser. No. 152,300, filed May 22, 1980, now U.S. Pat. No. 4,406,428, issued on Sept. 27, 1983.

THE FIELD OF INVENTION

This invention relates to aircraft having camouflage or deceptive coatings or the like thereon for the purpose of hiding the aircraft, or confusing the enemy.

HISTORICAL BACKGROUND

The use of camouflage for aircraft is well-known and this invention is an improvement over my U.S. Pat. No. 4,089,491 granted May 16, 1978. Prior to 4,089,491, no one had utilized the concept of applying to the underside of an aircraft a simulated cockpit canopy. Although various camouflage schemes have been used on aircraft, none had the idea of trying to confuse the enemy in such a manner that he was unable to quickly discern whether the aircraft was approaching or leaving. By applying the simulated cockpit canopy to the underside of the aircraft, the enemy even though he might be aware of the camouflage scheme, would have to spend a certain amount of time in evaluating the direction of the aircraft before he could make his own decision as to which way he should go, or may simply err in his decision as to aircraft direction with resulting incorrect action on his part.

OBJECTS AND SUMMARY

It is an object of this invention to provide a camouflage scheme which will cause the enemy to make mistakes, or delay the enemy in making a decision as to how to plan his attack or withdrawal.

Another object of this invention is to obtain an advantage to a pilot of the camouflaged aircraft enabling him to make his move before the enemy and thus gain the initiative in an attack or withdrawal situation.

Still a further object of this invention is to more realistically present a simulated cockpit canopy by enlarging it in one or another dimension from the true dimensions of the real cockpit canopy so that there would be little likelihood of distortion enabling a viewing pilot to comprehend readily which is the bottom or top of the aircraft he is in engagement with.

A further object of this invention is to provide a method for applying a simulated cockpit canopy on the bottom of an aircraft.

These and other objects of this invention will be apparent from a review of the following description.

In the accompanying drawings which illustrate by way of example various embodiments of this invention, FIG. 1 is a fragmentary schematic side elevational view of an aircraft with the simulated canopy outlined thereon.

FIGS. 3, 4, 5, 6 and 7 are cross-sectional views taken along the lines of 3, 4, 5, 6, and 7, respectively, of FIG. 1 and viewed in the direction of the arrows.

FIGS. 8, 9, 10 and 11 are cross-sectional views in outline of various modifications of the invention.

FIG. 12 is a side elevational view in outline showing a further modification of the invention.

FIGS. 1 THROUGH 7

Figure 1:
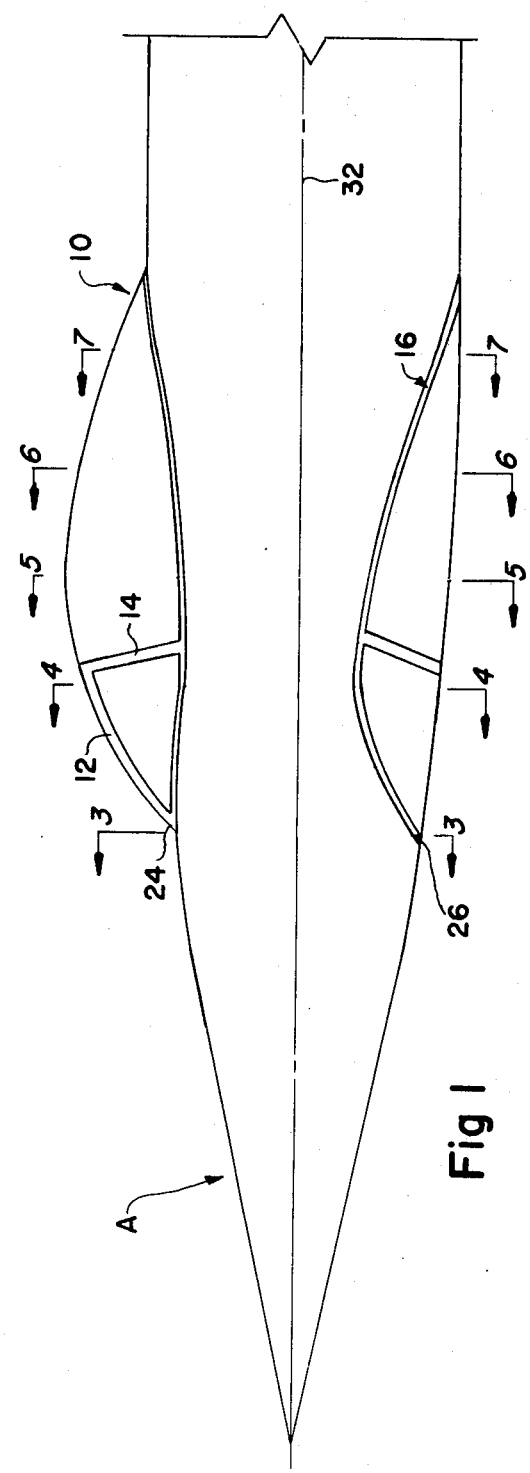

In FIG. 1, the aircraft A includes a real cockpit canopy 10 which may be constructed of transparent material such as plexiglass or other well known cockpit canopy materials and includes structural members 12 and 14.

Figure 2:
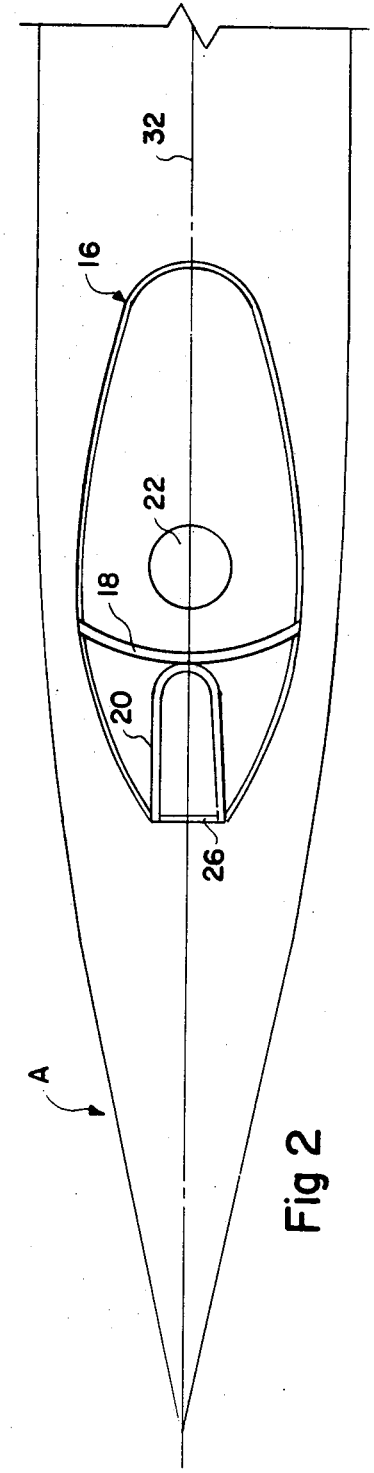
FIG. 2 is a fragmentary bottom plan view of the aircraft shown in FIG. 1.

On the bottom of the aircraft A a simulated cockpit canopy 16 is shown. The simulated cockpit canopy 16 may be painted or pasted or otherwise applied to the bottom of the aircraft A. The simulated cockpit canopy as shown in FIG. 2 may include outlines 18 and 20 representing structural members 12 and 14 of the real cockpit canopy 10. A pilot's head outline 22 may also be provided. The simulated cockpit canopy 16 is painted a contrasting color to the bottom of the aircraft A. For example, the simulated cockpit canopy could be a light color against a dark background or a dark color against a light background. The simulated structural members 18 and 20 as well as the simulated pilot's head and outline 22 will be of contrasting colors to stand out against the background upon which they are painted or otherwise applied to the aircraft A.

FIGS. 3, 4, 5, 6 and 7 show a series of outlined sections taken from FIG. 1. Graphically, FIG. 3 shows a flat front edge 24 and the top of the aircraft A corresponding to the front edge of the real cockpit canopy. The bottom surface of the development shown in FIG. 3 is provided with a simulated flat front edge 26. The simulated front edge 26 is applied to the bottom surface of the aircraft A in the same general position as the real cockpit canopy 10 and centered on the bottom of the aircraft A.

FIG. 4 which is the outline taken along line 4—4 of FIG. 1 shows how a projection 28 of the real cockpit canopy 10 is taken at a 45° angle from the edge of the canopy 30 at the one side of the longitudinal axis 32. It does not make any difference which side of the aircraft A the projection 28 is made so that the upper line 34 is tangent at the point 36 with the lower line 38 which extends from the canopy edge 30. Lines 34 and 38 are parallel to each other and at a 45° angle to horizontal line 40. A vertical center line 42 is provided for the purpose of developing the projection 44 which is similar to the projection 28. The projection 44 provides a bottom line 46 tangent at point 48 to the bottom of the aircraft A. Line 48 is at a 45° angle to the vertical center line 42. A median line 50 is constructed on bottom tangent line 46 equal to line 52 of the projection 28. Line 54 is drawn at right angles to median 52 to intersect the fuselage of aircraft A at point 56. A horizontal line 58 is now drawn from point 56 to the opposite side of the bottom of the aircraft A to point 60. Line 42 is perpendicular to line 58. The surface 62 between points 56 and 60 would be the limits of the outline of the simulated cockpit canopy 16. FIGS. 5, 6 and 7 show generally projections 64, 66 and 68 of the real cockpit canopy 10 for constructing the projections 70, 72 and 74.

FIGS. 8, 9 AND 10

In FIGS. 8, 9 and 10, a slightly different construction system is used. It will be noted that FIGS. 8, 9 and 10 show fuselages F1, F2 and F3 of different outline configurations from the fuselage shown in FIGS. 1 through 7. Line 76 on the right side of the figures cannot be made tangent to the aircraft fuselages F1, F2 and F3 nor can left line 78. In order to construct the simulated canopies C1, C2 and C3, the projections 80 are developed as at 81 so as to project on the bottom of the fuselages F1, F2 and F3 by centering of lines 82, 84 and 86 in a manner so that these lines 82, 84 and 86 extend on either side of the vertical center line 88. The simulated cockpit canopies C1, C2 and C3 are then defined between points 90 and 92. It is obvious that a series of projections similar to that shown in FIG. 1 would enable anyone to define the outer limits of the simulated cockpit canopy at each stage of development from front to rear. And will of course be noted that in the various developments as for example in FIGS. 3 through 7, the widest portion of the real cockpit canopy 10 is less than the widest portion of the simulated cockpit canopy 16. Similarly FIGS. 8, 9 and 10 show the widest portion of the real cockpit canopies R1, R2 and R3 as being less than the simulated cockpit canopies C1, C2 and C3.

FIG. 11

In FIG. 11, the real cockpit canopy R4 is reproduced as a simulated cockpit canopy C4 on the bottom of the fuselage F4 in the manner as set out in FIGS. 1 through 7. Projection 94 of the real cockpit canopy is duplicated on the bottom by projections 96. In FIG. 11, it will be noted that the width W of the real cockpit canopy R4 is greater than the simulated width W1 of the simulated cockpit canopy C4; however, the height H of the real cockpit canopy R4 is less than the height H1 of the simulated cockpit canopy C4.

FIG. 12

In FIG. 12, where the real cockpit canopy R5 ends at the spine 98, the simulated cockpit canopy C5 will be longer in order to enhance the effect of the canopy when viewed from fore and aft at a 45° angle from the bottom. The horizontal base line 100 begins at point 102 and is extended along the length of the fuselage outline F5. A right triangle is constructed so that the apex 104 will be fixed by line 106 touching point 102 and line 108 touching point 110. Line 112 and line 114 are drawn to meet lines 106 and 108 at the points where these lines touch the top surface of the main portion of the fuselage of F5 as at points 102 and 116. The lines 112 and 114 are extended to the bottom of the fuselage F5 to points 118 and 120 between which the simulated cockpit canopy C5 is then projected in the manner aforementioned as far as width is concerned.

FIGS. 13 AND 14

Figure 13:
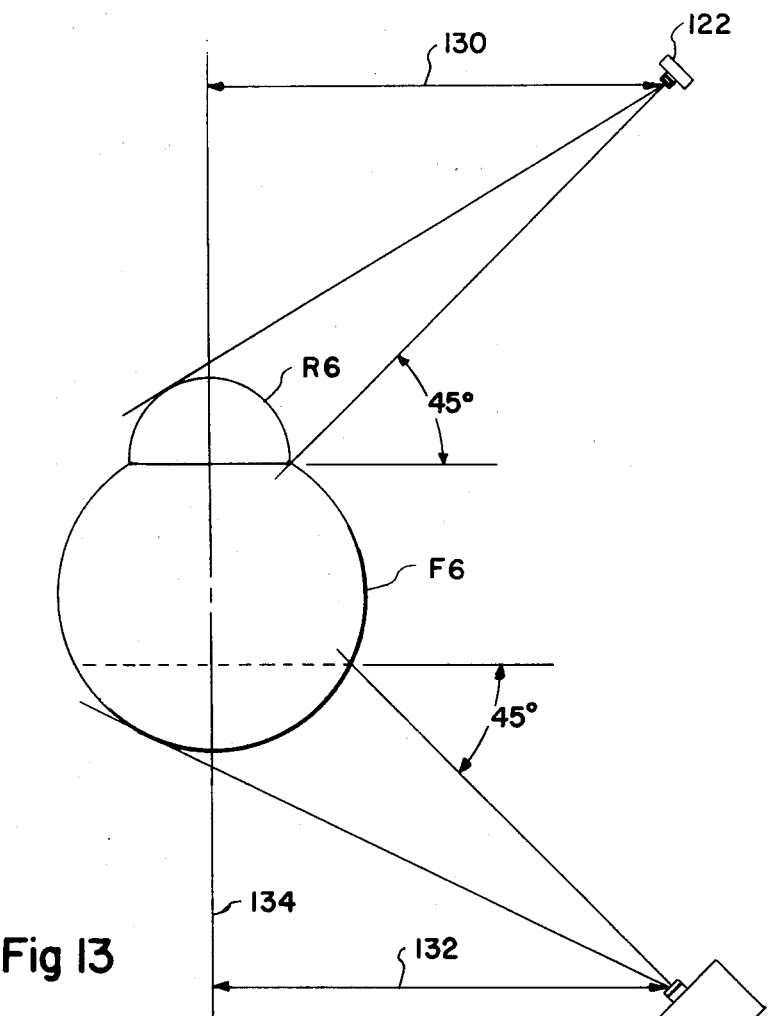
FIGS. 13 and 14 are fragmentary schematic front elevation and top plan views of a modified system of applying the camouflage system.
Figure 14:
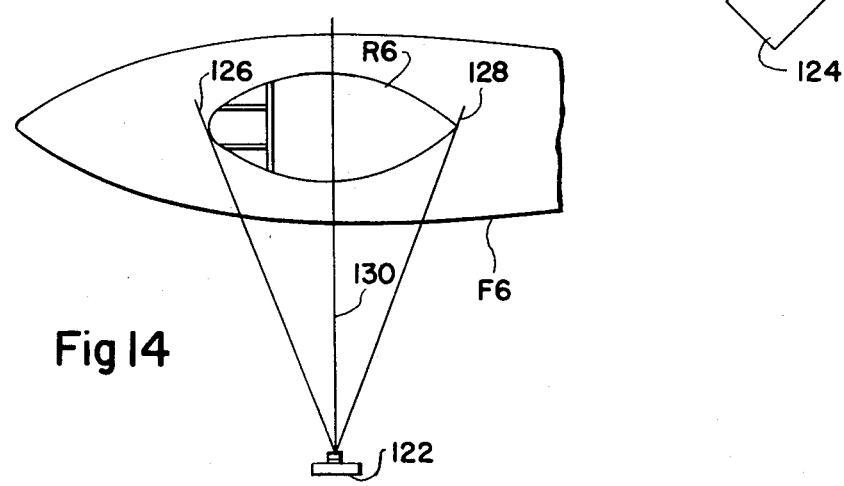

FIGS. 13 and 14 illustrate how a camera might be used to take a picture by means of camera 122 of the real cockpit canopy R6 of the fuselage F6 and have that picture projected by means of a projector 124 against the bottom of the fuselage F6. The camera and projector distances and the lens systems would be identical. FIG. 14 shows that the camera 122 would be positioned centrally of the real cockpit canopy R6 between points 126 and 128. Similarly, the projector 124 would also be positioned in like manner for projecting the image of the real cockpit canopy onto the bottom of the fuselage F6 at an angle 45° as illustrated in FIG. 13. The system tangency and 45° angle would apply in the manner as illustrated in FIGS. 1 through 7. Similarly centering might be necessary if the bottom of the fuselage was configured as in FIGS. 8, 9 and 10.

It should be noted that lines 130 and 132 are equal placing the camera 122 and projector 124 as equal distances from the vertical center line 134.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A camouflaged and deceptive perception distorted aircraft, comprising:
    a. an aircraft fuselage having nose, tail, top, bottom and side surfaces, and longitudinal and vertical axes;
    b. a real cockpit canopy on said top surface having length, width and height dimensions;
    c. a simulated cockpit canopy on said bottom surface positioned substantially in the same general area as said real cockpit canopy so that only one of said cockpit canopies is visible when said aircraft is perceived directly above said top surface or directly below said bottom surface;
    d. said simulated cockpit canopy having dimensions simulating the length, width and height of said real cockpit canopy;
    e. at least one of said simulated cockpit canopy dimensions being substantially greater than the corresponding length, width or height dimension of said real cockpit canopy;
    f. said simulated cockpit canopy when viewed from below said aircraft at an angle of approximately 45° from the vertical axis of the fuselage being a visually identical projection of said real cockpit canopy when said real cockpit canopy is viewed above said aircraft at substantially the same angle; and,
    g. at least one of said simulated cockpit canopy dimensions being observable from below said aircraft at a substantial angle from the vertical axis of said fuselage thus enhancing deceptive perception by reducing angular viewing distortion by enemy aircraft.

2. A camouflaged aircraft as in claim 1, wherein:
    a. said real cockpit canopy width dimension is substantially less than said simulated cockpit canopy width dimension.

3. A camouflaged aircraft as in claim 1, wherein:
    a. said real cockpit canopy height dimension is substantially greater than said simulated cockpit canopy height dimension.

4. A camouflaged aircraft as defined in claim 1, wherein:
    a. said real cockpit canopy length dimension is substantially less than said simulated cockpit canopy length dimension.

5. A camouflaged aircraft as defined in claim 1, wherein:
    a. said real cockpit canopy height dimension is substantially greater than said simulated cockpit canopy height dimension; and,
    b. said real cockpit width dimension is substantially less than said simulated cockpit canopy width dimension.

6. A camouflaged aircraft as defined in claim 1, wherein:
    a. at least one of said simulated cockpit canopy dimensions is observable from below said aircraft at an angle from the vertical axis of said fuselage of about 45°.

* * * * *